(12) United States Patent
Gumbmann

(10) Patent No.: US 9,658,320 B2
(45) Date of Patent: May 23, 2017

(54) SYSTEM AND A METHOD FOR ILLUMINATION AND IMAGING OF AN OBJECT

(71) Applicant: Rohde & Schwarz GmbH & Co. KG, Munich (DE)

(72) Inventor: Frank Gumbmann, Nuremburg (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 431 days.

(21) Appl. No.: 14/331,220

(22) Filed: Jul. 14, 2014

(65) Prior Publication Data

US 2015/0022391 A1    Jan. 22, 2015

(30) Foreign Application Priority Data

Jul. 18, 2013   (DE) .................. 10 2013 214 141
Sep. 17, 2013   (DE) .................. 10 2013 218 555

(51) Int. Cl.
*G01S 7/02* (2006.01)
*G01S 13/89* (2006.01)
*G01S 13/88* (2006.01)
*G01S 13/46* (2006.01)

(52) U.S. Cl.
CPC ............ *G01S 7/024* (2013.01); *G01S 13/887* (2013.01); *G01S 13/89* (2013.01); *G01S 2013/462* (2013.01)

(58) Field of Classification Search
CPC .................. G01S 13/887; G01S 13/89; G01S 7/024–7/026; G01S 2013/462; H01Q 15/12; H01Q 15/22; H01Q 15/24; H01Q 15/248; H01Q 19/08; H01Q 19/195
See application file for complete search history.

(56) References Cited

U.S. PATENT DOCUMENTS

| | | | | |
|---|---|---|---|---|
| 3,430,246 A | * | 2/1969 | Parquier ............... | H01Q 19/18 343/756 |
| 3,737,904 A | * | 6/1973 | Mori ..................... | H01Q 15/22 342/5 |
| 4,599,623 A | * | 7/1986 | Havkin ................ | H01Q 19/195 343/756 |
| 4,910,523 A | * | 3/1990 | Huguenin ............. | G01S 7/024 250/332 |
| 5,073,782 A | * | 12/1991 | Huguenin ............. | G01S 7/024 250/332 |
| 5,202,692 A | * | 4/1993 | Huguenin ............. | G01S 1/047 250/332 |
| 5,227,800 A | * | 7/1993 | Huguenin ............. | G01S 7/024 250/332 |

(Continued)

FOREIGN PATENT DOCUMENTS

DE    102011078539 A1    12/2012

*Primary Examiner* — Matthew M Barker
(74) *Attorney, Agent, or Firm* — Potomac Technology Law, LLC

(57) ABSTRACT

The invention relates to a system for the illumination and imaging of objects with the assistance of electromagnetic radiation, for example, millimeter radiation. Such a system comprises at least one transmitting antenna, at least one receiving antenna, and at least one reflector element. An actively polarizing material layer is present on the reflector element. A processing unit determines an image of the object on the basis of the radiation received from the receiving antenna.

14 Claims, 12 Drawing Sheets

(56) References Cited

U.S. PATENT DOCUMENTS

| | | | | |
|---|---|---|---|---|
| 5,982,326 A | * | 11/1999 | Chow | H01Q 9/0435 |
| | | | | 342/365 |
| 6,664,916 B1 | * | 12/2003 | Stafford | G01S 13/91 |
| | | | | 342/159 |
| 6,703,980 B2 | * | 3/2004 | Chekroun | H01Q 19/10 |
| | | | | 343/754 |
| 7,176,827 B2 | * | 2/2007 | Appleby | H01Q 15/244 |
| | | | | 342/22 |
| 7,304,617 B2 | * | 12/2007 | Lynch | H01Q 3/46 |
| | | | | 333/202 |
| 7,948,428 B2 | * | 5/2011 | Lovberg | G01K 11/006 |
| | | | | 342/22 |
| 2007/0076774 A1 | * | 4/2007 | Brown | H03F 3/24 |
| | | | | 372/50.11 |
| 2014/0063055 A1 | * | 3/2014 | Osterhout | G06F 3/005 |
| | | | | 345/633 |
| 2014/0125517 A1 | | 5/2014 | Ahmed et al. | |

* cited by examiner

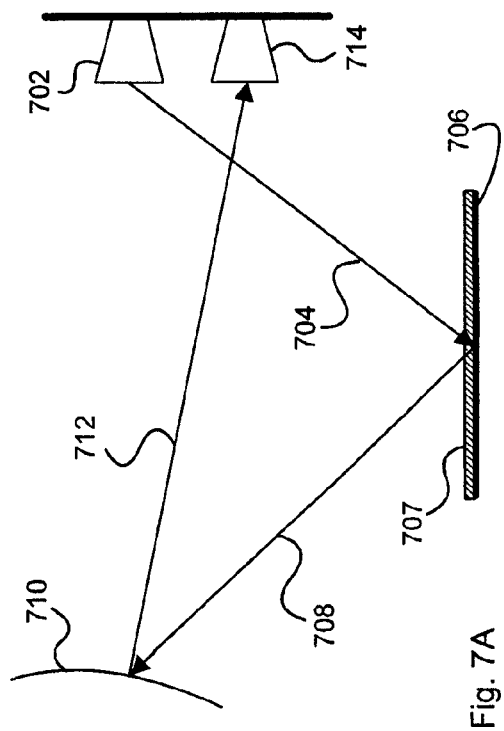
Fig. 7A
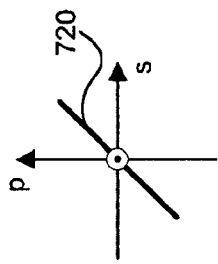
Fig. 7B
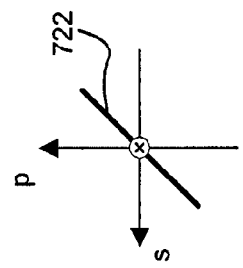
Fig. 7C
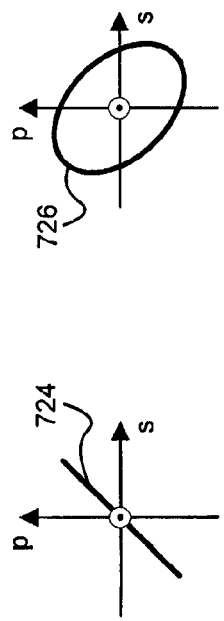
Fig. 7D
Fig. 7E
Fig. 7F
Fig. 7G

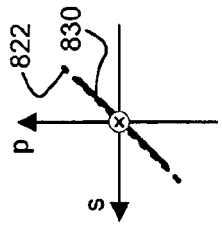
Fig. 8B
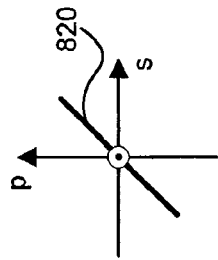
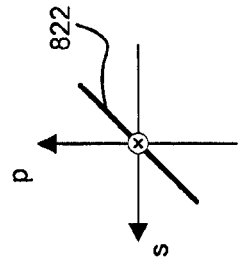
Fig. 8C
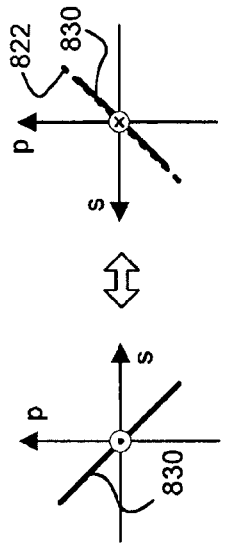
Fig. 8H
Fig. 8G
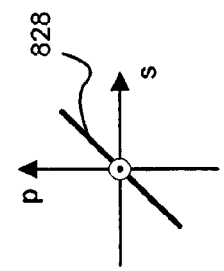
Fig. 8F
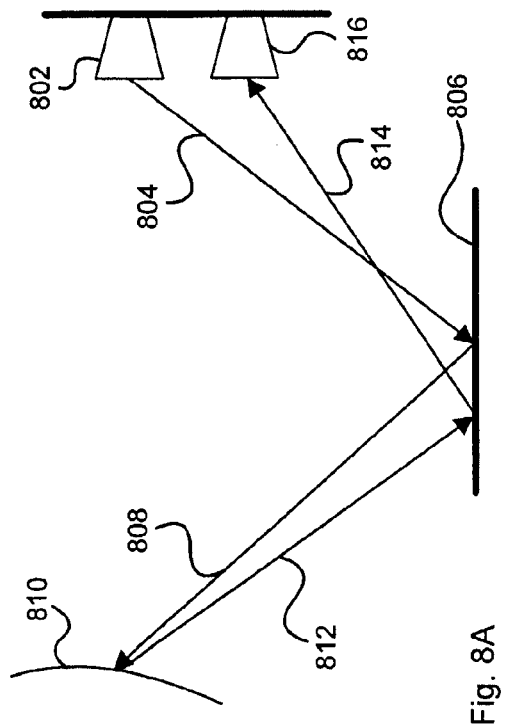
Fig. 8A
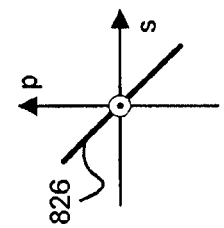
Fig. 8E
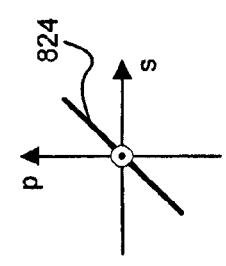
Fig. 8D

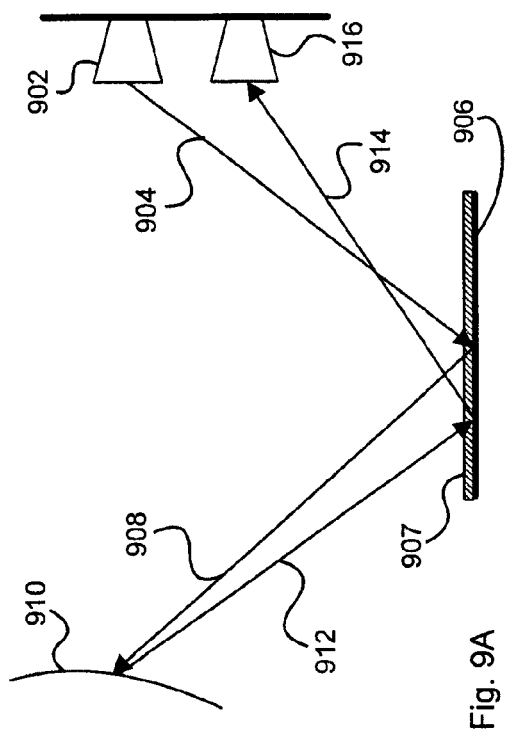
Fig. 9A
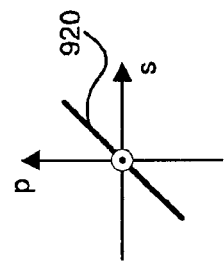
Fig. 9B
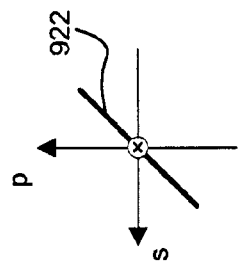
Fig. 9C
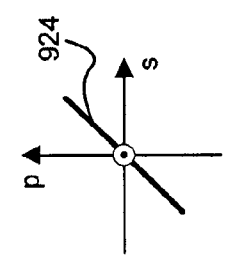
Fig. 9D
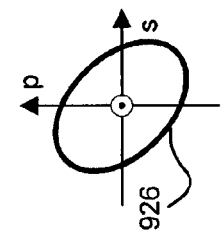
Fig. 9E
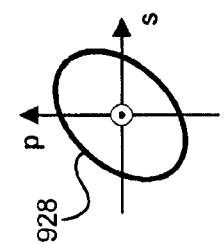
Fig. 9F
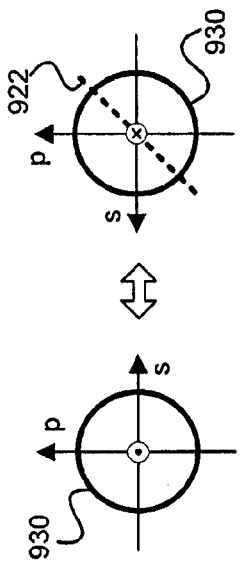
Fig. 9G
Fig. 9H

SYSTEM AND A METHOD FOR ILLUMINATION AND IMAGING OF AN OBJECT

FIELD OF THE INVENTION

The present invention relates to a system for the illumination and imaging of objects with the use of electromagnetic radiation, for example, millimeter radiation, and an operating method for such a system.

BACKGROUND OF THE INVENTION

Microwaves, especially millimeter waves, are increasingly used, inter alia, for full body scanners. Millimeter waves are suitable for the detection of metallic and also nonmetallic objects, for example, ceramic objects such as knives. At the same time, air and other materials, such as are used for clothing, are transparent for such radiation. Accordingly, millimeter waves can be used for contactless scanners for the detection of objects concealed under the clothing. Such scanners are superior to metal detectors and can supplement or replace the latter, for example, in the field of security checks at airports or security-relevant public facilities.

In the operation of such a scanner, a microwave signal with a given bandwidth is generated and transmitted from at least one antenna in the direction towards a human body with objects concealed, optionally under the clothing. The microwave signals are reflected from the body and from the concealed objects. The reflections are received by at least one antenna. Transmitting and receiving antenna can be provided separately.

A scanner can also comprise a plurality of transmitting and/or receiving antennas. Such a scanner can be operated, for example, in a multi-static mode in which a transmitting antenna transmits a signal, and reflections of this signal are received according to amplitude and phase position by several or all receiving antennas. In another multi-static mode, several transmitting antennas can also transmit simultaneously, whereas the reflected signal of each individual transmitting antenna is received in each case by a plurality of receiving antennas.

Processes of aperture-synthesis can be used, for example, processes of digital beam forming ("Digital Beam-forming", DBF), in which a focusing of the transmitted and/or received radiation can be implemented for the object scanning through lenses or similar without mechanical movement of the antennas and without electromagnetic bundling; instead, a focusing takes place only through targeted control of the transmitting antennas and/or evaluation of the signals detected by the receiving antennas. In the latter case, a signal reflected from a given spatial point in the direction towards several antennas and received there is evaluated, for example, through a software-based algorithm.

The German patent publication DE 10 2011 078 539 A1 describes a device for the illumination of an object under investigation, where the device comprises at least one reflector element for the reflection of microwave signals. In addition to the rays radiated directly onto the object and reflected from the latter, further microwave signals travelling via the reflector element are received and used for the reconstruction of the image of the object under investigation. For the synthetic focusing, the representation of one or more virtual transmitting or receiving antennas, whose positions correspond to the real positions of real transmitting respectively receiving antennas reflected on an angle of reflection, is assumed here.

The reflector element allows an improved illumination of object regions which are illuminated too little or not at all by directly radiated signals. However, reflections of the object caused by the reflector element can lead to disturbances in the reconstruction, that is, the imaging of the object.

What is therefore needed is an approach for imaging an object in which disturbances in the reconstruction caused by a reflection element can be minimized, and accordingly, an improved illumination and also an improved imaging quality can be achieved.

BRIEF SUMMARY OF THE INVENTION

The present invention advantageously addresses the foregoing requirements and needs, as well as others, by providing a system and method for the illumination and imaging of objects with the use of electromagnetic radiation, which minimizes disturbances in the reconstruction caused by reflection elements, and thereby achieves improved illumination and imaging quality.

According to example embodiments of the invention, a system for the imaging of an object is provided, which comprises at least one transmitting antenna for the transmission of electromagnetic radiation of a first polarization state for the illumination of the object. At least one receiving antenna is provided for the reception of radiation of a second polarization state reflected from the object. At least one reflector element serves for the reflection of radiation transmitted from the transmitting antenna in the direction towards the object and/or for the reflection of radiation reflected from the object in the direction towards the receiving antenna. An actively polarizing material layer is provided on the reflector element, in order to transform a radiation component reflected from the reflector element into a polarization state such that the radiation component in the receiving antenna is in the second polarization state. A processing unit serves to determine the image of the object on the basis of the radiation received by the receiving antenna.

The system can be defined for the illumination and imaging of an object such as a person or also an animal or inanimate object. Certain embodiments of the system have the purpose of detecting objects concealed on a person's body under their clothing, which can include nonmetallic objects such as ceramic weapons or objects made from plastic explosives formed close to the body.

The transmitting and/or receiving antennas can relate to horn antennas, for example. The electromagnetic radiation can comprise, for example, microwaves, that is, for example, radiation in the wavelength range from 1 mm to 10 mm.

The first polarization state of the transmitted radiation and the second polarization state of the received radiation can be the same or can be different, that is, the transmitting and the receiving antenna can be embodied for the transmission respectively the reception of radiation of one and the same polarization state, or the receiving antenna is embodied for the reception of radiation of one polarization state which differs from the polarization state of the transmitted radiation. A polarization state can also relate to the transmission respectively the reception of non-polarized radiation.

With certain embodiments, the first polarization state and also the second polarization state relate, in each case, to a linear polarization, that is, the transmitting antenna is embodied for the transmission of linear polarized radiation, and the receiving antenna is embodied for the reception of linear polarized radiation. For example, the transmitting antenna can be embodied for the transmission of linear polarized radiation of a first oscillation direction, and the receiving antenna can be embodied for the reception of linear polarized radiation of a second oscillation direction. The first and the second oscillation direction can be the same or can be different, and can be tilted relative to one another, for example, by 80° to 100°, by preference 90°.

The reflector element can have a flat or also curved reflecting surface. The reflector element can be made for example from a reflecting metallic material.

The actively polarizing material layer can comprise a coating, layer, panel, sheet, film, protective layer, plating or deposit on the reflector element. The material layer can be active in transforming a linear polarization of incident radiation into an elliptical polarization of the reflected radiation. Here and in the following, an elliptical polarization is also to include the special case of a circular polarization.

The actively polarizing material layer can also be embodied to transform a linear polarization into another linear polarization, or to cause a reflection on the reflector element such that a linear polarization is retained, that is, an oscillation direction of the incident and emergent radiation remains unchanged.

The material of the layer can comprise a dielectric. The coating can preferably comprise polyethylene terephthalate (PET), polyvinyl chloride (PVC), polycarbonate (PC), glass, acrylic glass, and/or rubber; however, this list is not exclusive and other active dielectric and/or insulating materials can be used alternatively or additionally.

Embodiments of actively polarizing coatings or layers can comprise, for example, ruled gratings or comparably active arrangements, such as layers or coatings with electromagnetically active particles, such as nanoparticles. For example, with two fitted reflector elements, one can be provided with a coating, which introduces a polarization into a radiation, and the other reflector element can act on an existing polarization, for example, by transforming a linear into an elliptical polarization.

A thickness of the material layer can be selected to be less than one quarter of a wavelength of the electromagnetic radiation. The thickness can also be selected to be greater than one quarter of the wavelength, however, it should be disposed outside a range around one quarter of the wavelength at which an incident radiation is undesirably strongly absorbed. With different embodiments, the thickness can therefore be appropriately disposed below one quarter of the wavelength, or above one quarter of the wavelength, but below half the wavelength, and so on.

Disturbances in the reconstruction of the object can, under some circumstances, also be minimized through an appropriate adjustment of the reception level of the reflections in the receiving antenna. Material and/or thickness of the coating material can therefore also be selected within the relevant wavelength range according to general reflection respectively absorption properties.

A relative permittivity coefficient of the material of the layer can be between 2 and 4, preferably between 2.5 and 3.5. With alternative embodiments, a relative permittivity coefficient of the layer material is selected to be greater than 5, preferably greater than or equal to 6.

With embodiments of the system according to the invention, the material layer is embodied in such a manner that a radiation component reflected singly from the reflector element is preferably detected in the receiving antenna. Additionally or alternatively, the reception of other radiation components in the receiving antenna, for example, of multi-wave components of the radiation which are reflected twice on the reflector element, can be suppressed.

With some of the previously named embodiments, the material layer is embodied to be actively polarizing in such a manner that, in the receiving antenna, a superposition comprising the singly reflected radiation component and a radiation component reflected twice from the reflector element is detected. Both components can be polarized, for example, in such a manner that they couple approximately equally strongly in the receiving antenna.

With many embodiments of the system according to the invention, the reflector element is tilted with reference to a plane in which the transmitting and/or receiving antennas are arranged, by 45° to 135°, preferably 80° to 100°. If the antennas are arranged in a perpendicular plane above a floor, the reflector element can extend parallel to the floor, and can lie approximately on the floor or form a floor panel of the system, or can be arranged at an overhead height parallel to the floor.

The system can comprise a plurality of transmitting and/or receiving antennas in a mono-static, bi-static or multi-static configuration. The processing unit can be embodied in order to implement a transmitter-end and/or receiver-end synthetic focusing.

Furthermore, a method for imaging an object which comprises the following steps is provided according to example embodiments of the invention: transmission of electromagnetic radiation of a first polarization state for the illumination of the object; reflection, from at least one reflector element, of radiation transmitted from the transmitting antenna in the direction towards the object and/or of radiation reflected from the object in the direction towards the receiving antenna, whereas, through an actively polarizing material layer on the reflector element, a radiation component reflected from the reflector element is transformed into a polarization state such that the radiation component in the receiving antenna is in the second polarization state; reception of radiation of a second polarization state reflected from the object and determination of the image of the object on the basis of the radiation received from the receiving antenna.

From the perspective of the invention, a known imaging system with uncoated reflector element represents only a special case in which given reflected images are preferably detectable, but others are suppressed. However, with the actively polarizing coating provided according to example embodiments of the invention, influence can be exerted upon which of the reflected images generated by the reflector element are detected by the receiving antennas with which strength; this also includes desired super-positions of reflected images.

Accordingly, the person skilled in the art gains additional configuration possibilities in order to optimize illumination and also imaging quality of a concrete system.

Accordingly, the illumination in edge regions of the detector can be improved, for example, in the foot respectively floor region of full body scanners, whereas disturbances in the reconstruction can be minimized. The range of use of reflector elements for the improved illumination of objects is expanded; for example, in the case of existing configurations, further reflector elements can be added in order further to improve an illumination.

A coating according to example embodiments of the invention can be realized in a simple manner through the layering or gluing of layers, films, mats or plates made from commercially available materials such as PVC or glass, for example, onto a metallic reflector element in a cost favorable manner. If a controlling of the transmitting antennas and/or evaluation of the received signals is to be matched, this generally only requires modifications to a software, so that, alongside the provision of coated reflector panels, such as a coated floor panel, no other modifications to a hardware configuration are necessary. An upgrade of existing systems is therefore readily possible, by providing an existing reflector with a coating or replacing it with a coated reflector, and, optionally, implementing a software update.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, with reference to the appended drawings, in which:

FIG. 7A-G illustrate schematic views of the transformation of polarization states along the pathway of FIG. 3C in the case of a coated reflector element;

FIG. 8A-H illustrate schematic views of the transformation of polarization states along the pathway of FIG. 3D in the case of an uncoated reflector element;

FIG. 9A-H illustrate schematic views of the transformation of polarization states along the pathway of FIG. 3D in the case of a coated reflector element;

DETAILED DESCRIPTION OF EMBODIMENTS

A system and methods for the illumination and imaging of objects with the use of electromagnetic radiation, which minimizes disturbances in the reconstruction caused by reflection elements, and thereby achieves improved illumination and imaging quality, is described. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

Figure 1A:
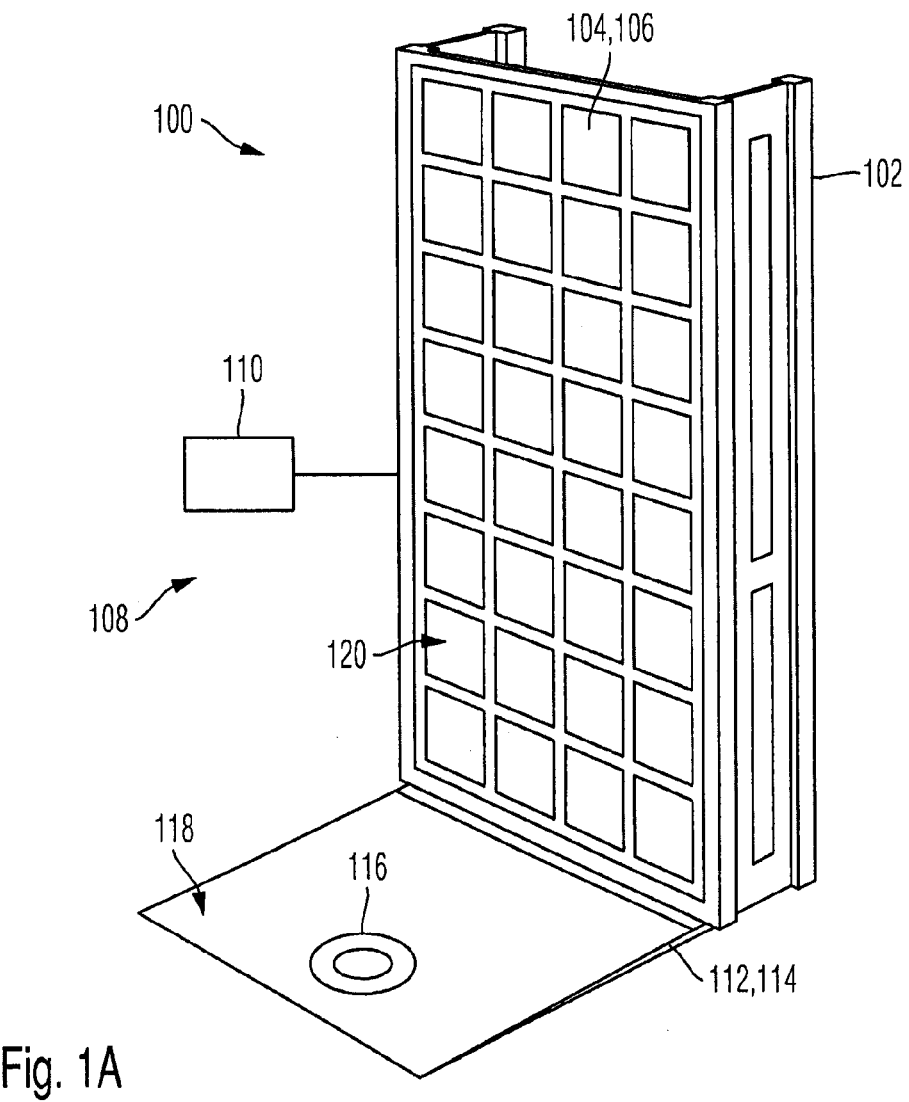
FIG. 1A illustrates a diagram of an imaging system according to example embodiments of the invention.
Figure 1B:
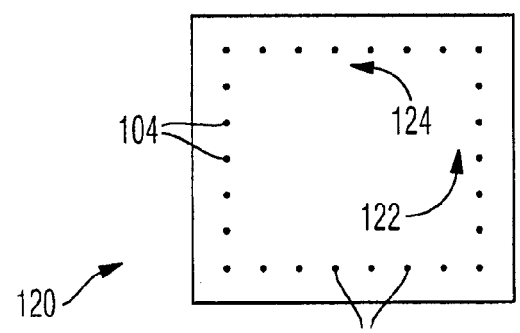
FIG. 1B illustrates a detail view of an antenna arrangement of the imaging system from FIG. 1A.

FIG. 1A illustrates a diagram of an imaging system 100 according to example embodiments of the invention, and FIG. 1B illustrates a detail view of an antenna arrangement of the imaging system from FIG. 1A. The system 100 comprises a perpendicular frame 102, in which a plurality of transmitting antennas 104 and receiving antennas 106 are arranged. The transmitting antennas 104 are embodied to radiate linear polarized microwaves into a region 108 in front of the frame 102, in order to illuminate an object disposed there, for example, a person. The receiving antennas 106 serve for the reception of radiation reflected from the object and are embodied for the reception of linear polarized radiation.

A processing unit 110 serves for the control of the antennas 104, 106 and the determination of an image of the object on the basis of signals which represent the radiation received by the receiving antennas 106. The processing unit 110 can be embodied for the transmitter-end and/or receiver-end synthetic focusing. The antennas 104, 106 can be operated, for example, in a multi-static configuration.

On the floor in front of the frame 102, a floor panel 112 with a reflector element 114 is disposed. Panel 112 and element 114 are arranged at an angle of 90° to the frame 102 with the antennas 104, 106 and, in this example, limit the illumination region downwards. Microwaves transmitted from the transmitting antennas 104 are reflected by the reflector element 114 in the direction towards the object. Furthermore, radiation reflected from the object is reflected in the direction towards the receiving antennas 106. The element 114 can comprise, for example, a metallic, reflecting panel, on which a person to be illuminated stands in a region marked by the symbol 116.

On the reflector element 114, that is, on its side facing towards the illumination region 108, an actively polarizing coating 118 is applied. The latter serves to transform a radiation component reflected from the reflector element 114 into a polarization state such that this radiation component is detected in the receiving antennas 106, because its polarization state agrees with the linear polarization of the antennas 106. In the present example, the coating 118 transforms incident, linear polarized radiation into elliptical polarized radiation.

Figure 2:
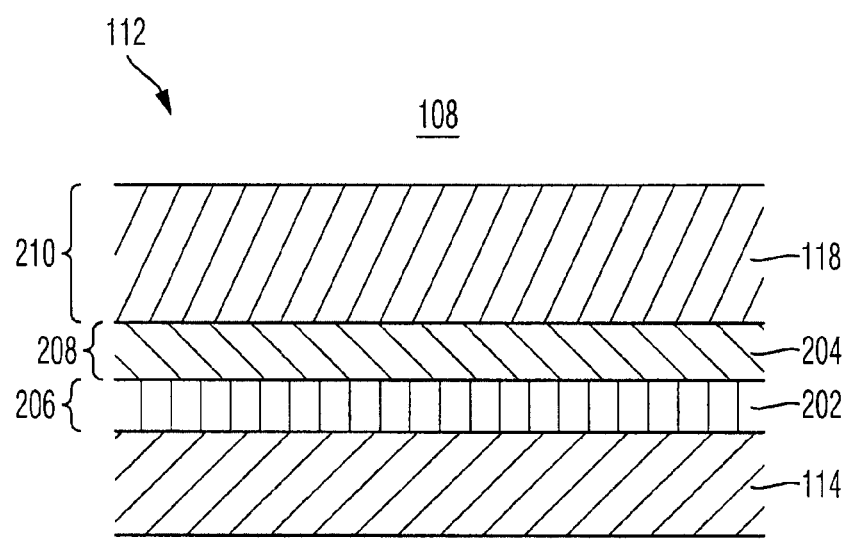
FIG. 2 illustrates a sectional view of a coated reflector element according to example embodiments of the invention.

FIG. 2 illustrates a schematic cross section of the floor panel 112 with reflector element 114 and polarizing coating 118. The reflector element 114 can, for example, be embodied as a reflecting metal panel or layer, whereas the metal can be, for example, aluminum. The metallic layer can be sufficiently thick, for example, to be suitable for a use as or in a floor panel 112. Additionally or alternatively, the reflector element 114 can be mechanically stabilized by further layers or panels (not shown), which are attached to the reflector element on the side facing away from the illumination region 108.

In the direction towards the illumination region 108, a painted layer 202 can be applied to the reflector element 114. The layer 202 can serve for the protection of the reflector element 114 from mechanical and/or chemical stress and can, for example, comprise a clear varnish. In other exemplary embodiments, a protective or painted layer can also be omitted.

On the painted layer 202, an adhesive layer 204 is applied, which serves for the mechanical attachment of the polarizing coating 118 arranged above to the reflector element 114 respectively the floor panel 112. The material of the adhesive layer 204 should be selected dependent upon the materials of the adjacent layers 118 and 202 and according to the required manufacturing process; for a hot gluing process for the gluing of the coating 118 to the reflector element 114, for example, a melting adhesive can be used.

An attachment of the polarizing coating 118 to the reflector element 114 can also be implemented in a different manner instead of by gluing, for example, a mechanical attachment by means of clips, screws or rivets can be provided. If the reflector element is a part of a floor panel, an actively polarizing layer, plate or protective layer can also be placed, in the simplest case, without further attachment, simply onto the reflector element; for example, reflector element and protective layer can be held by a common frame.

Accordingly, the adhesive layer 204 and also the painted layer 202 can also be omitted in other exemplary embodiments. However, if one or more layers are provided, such as a painted layer comparable with layer 202, an adhesive layer comparable with layer 204 and/or further or other layers, these contribute, under some circumstances, to the active polarization of the coating 118. In this sense, layers such as the layers 202 and 204 should be reckoned together with the coating 118. In the following, this aspect will not be explicitly mentioned every time for reasons of clarity. The actively polarizing coating 118 can comprise a dielectric material. The coating 118 can be made, for example, from a material such as glass or a vitreous material, including polycarbonate (PC), polymethyl methacrylate (PMMA) respectively acrylic glass or plexiglass, polyethylene terephthalate (PET), or other synthetic glasses. Additionally or alternatively, the material of the coating 118 can also comprise other actively polarizing materials, such as polyethylene terephthalate (PET), polyvinyl chloride (PVC) or rubber, for example, poly-acrylic rubber and/or C1 rubber. Materials with adjustable respectively controllable permittivity which contain, for example, liquid crystals, can also be used.

A thickness 206 of the painted layer 202 can be between 10 micrometers and 70 micrometers, preferably between 10 micrometers and 60 micrometers, by particular preference between 10 micrometers and 50 micrometers. A thickness 208 of the adhesive layer 204 can be between 10 micrometers and 70 micrometers, preferably between 10 micrometers and 60 micrometers, by particular preference between 10 micrometers and 50 micrometers.

If the active polarization is to be determined substantially by the coating 118, the thicknesses 206 and 208 should each be selected to be as thin as possible. Alternatively, if an active polarization of the layers 202 and/or 204 is well known and can contribute to a desired active polarization, this can be taken into account for the effective respectively total active polarization. Accordingly, exemplary embodiments are conceivable, in which only one layer is applied to a reflector element, which serves, for example, both as protection (protective varnish) and is also actively polarizing in the desired manner.

A thickness 210 of the coating 118 is to be selected dependent upon the desired active polarization. The (effective respectively actively radiating) thickness 210 can be designed, for example, such that it is less than one quarter of a wavelength of the radiation used, taking into consideration a permittivity coefficient of a dielectric, if such is used for the coating 118. With frequencies of the used radiation in the range from 30 GHz to 100 GHz, preferably in the range from 70 GHz to 80 GHz, wavelengths of approximately 10 millimeters to 3 millimeters, preferably approximately 3.7 millimeters to 4.3 millimeters are obtained.

If an acrylic glass, for example, with a relative permittivity coefficient of 2.8 is selected as the coating material, a thickness 210 between 250 micrometers and 600 micrometers, preferably 300 micrometers and 400 micrometers can be selected. In the case of a concrete exemplary embodiment, the thickness 210 of the used acrylic glass can be selected at 350 micrometers. In this context, it can be taken into account that, with a painted layer 202 with a thickness 206 of 50 micrometers and an adhesive layer 204 with a thickness 208 of 50 micrometers, an effective relative permittivity of approximately 3.1 can be adjusted; the detailed value is dependent upon the optical properties of the painted and adhesive layer.

If PVC is selected as the material of the layer 118, a thickness 210 of this layer 118 can be selected between 200 micrometers and 500 micrometers, preferably 200 micrometers and 300 micrometers. In the case of a concrete exemplary embodiment, the thickness 210 of the used PVC layer 118 can be selected at 220 micrometers.

FIG. 3A-3D illustrate schematic views of various pathways of beams which are transmitted from an antenna element 120 of the system 100 from FIG. 1A-B in the direction towards an object 302. Through the use of the reflector element 114, multipath signals are generated, that is, different reflected images are formed at the location of the antenna element 120.

In FIG. 1B, the structure of the antenna element 120 is shown. The antenna element 120 comprises a plurality of transmitting antennas 104 and a plurality of receiving antennas 106. The transmitting antennas 104 can be arranged in a perpendicular pattern or structure 122 one above the other, and the receiving antennas 106 in a separate horizontal pattern or structure 124. For reasons of the explanation, reference will be made to such an arrangement in the following. Alternatively, however, transmitting and receiving antennas can also be arranged in other, also overlapping patterns, for example, alternating within a common pattern.

Figure 3D:
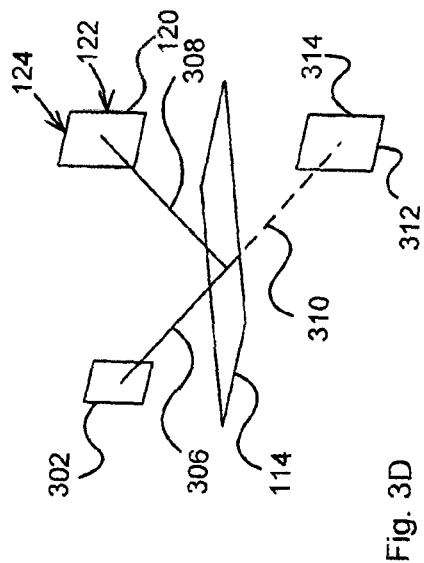
FIG. 3A-D illustrate schematic views of various pathways of transmitted and reflected rays in the system from FIG. 1A.
Figure 3C:
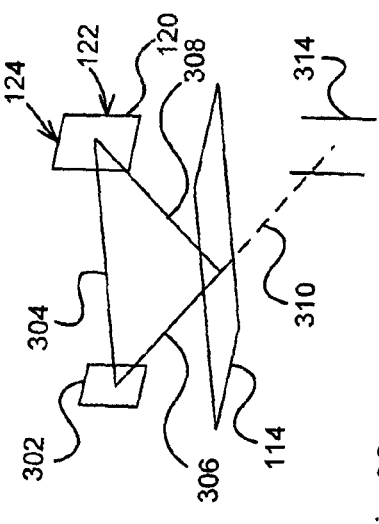
Figure 3A:
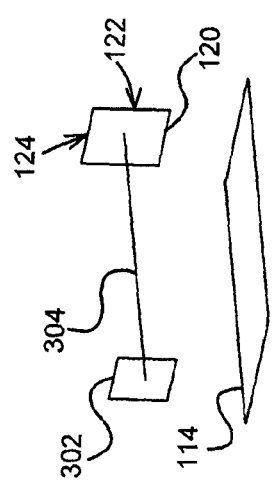

FIG. 3A visualizes a direct pathway 304 of radiation which is transmitted from the antenna element 120, more precisely the transmitting antennas of the structure 122. The radiation strikes the object 302 and travels directly, that is, without reflection by the reflector element 114, back to the antenna element 120, and can be detected there by the receiving antennas of the structure 124.

Figure 3B:
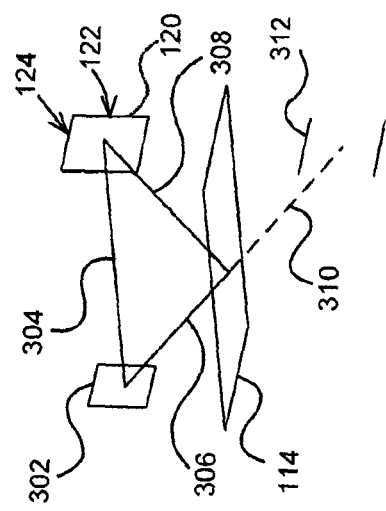

FIG. 3B visualizes a single reflection of the object 302 by the reflector element 114, namely, a reflection of the received signal. Radiation transmitted on the pathway 304 is reflected on the object 302 in the direction towards the reflector element 114, reflected on the reflector element 114 and accordingly travels on the pathway 306, 308 to the receiving structure 124. This is equivalent to a virtual pathway 306, 310, in which the reflector element 114 is removed in imagination, and the radiation reflected from the object 302 travels on the pathway 306, 310 to virtual receiving structure 312, disposed below the reflector element 114 of the associated floor panel 112. The position of the virtual receiving structure 312 corresponds to those of the receiving structure 124, however, reflected on an axis of reflection which is disposed in the plane of the reflector panel 114.

FIG. 3C visualizes a further single reflection of the object 302 through the reflector element 114, namely a reflection of the transmitted signal. Radiation transmitted on the pathway 308 is reflected on the reflector element 114 in the direction towards the object 302, is reflected again on the object 302 and thus travels on the pathway 304 to the receiving structure 124. This is equivalent to a virtual pathway 310, 306 in which radiation strikes the object 302 from a virtual transmitting structure 314 below the reflector element 114 and travels from there in the direction towards the real receiving structure 124.

FIG. 3D visualizes a twofold reflection of the object 302 by the reflector element 114. In this context, radiation transmitted on the pathway 308 is reflected on the reflector element 114 in the direction towards the object 302. At the object 302, the radiation is reflected back to the reflector element 114 and reflected there in the direction towards the receiving structure 124. This is equivalent to a virtual pathway 310, 306, 306, 310 in which radiation strikes the object 302 from the virtual transmitting structure 314 below the reflector element 114 and travels back from there in the direction towards the virtual receiving structure 312 also below the reflector element 114.

The single reflection visualized in FIGS. 3B and 3C causes a gap-free enlargement of the effectively illuminated aperture in the direction of the reflecting plane, that is, in the example of FIG. 1, below the floor respectively the floor panel 112. In particular, the illumination of objects or respectively object regions which extend substantially parallel to the antenna respectively sensor arrangement, that is, approximately parallel to the frame 102 in FIG. 1, can be improved. For this purpose, the reflector element, that is, the reflector plane must extend in an appropriate manner between the antenna arrangement and the frame. In the example of a full body scanner, the illumination of the lower leg, including any objects which may be present there, can be improved, when the person stands on (or directly behind) a metallic floor panel, and, for example, on the symbol 116 of the system 100 in FIG. 1.

The twofold reflection visualized in FIG. 3D causes an improvement of the detection of objects strongly inclined with reference to the plane of the antenna arrangement. This includes the first time or improved detection of edges.

With an uncoated reflector element, only a given multi-path signal is generated, that is, a given superposition of single and twofold reflections. With reflectors coated according to the invention, the type of multi-path signal can be controlled, that is, a desired combination of single and twofold reflections can be introduced with an illumination optimal for the concrete application case with minimal disturbances in the reconstruction. This is achieved via an actively polarizing coating according to the invention on the reflector element.

In the following, changes of polarization states along the radiation respectively signal paths are described initially for exemplary configurations of single and twofold reflections, and in fact, in each case, for an uncoated reflector element and for a coated reflector element.

In FIG. 4A-4G, polarization states for a single reflection of the received signal according to FIG. 3B are visualized with an uncoated reflector. FIG. 4A again shows in schematic form a pathway of the radiation which is transmitted from a transmitting antenna 402 via a path respectively pathway 404 in the direction towards an object 406. From the object 406, the radiation is reflected via a pathway 408 in the direction towards an uncoated reflector element 410. From the element 410, the radiation is reflected via a pathway 412 to a receiving antenna 414.

Figure 4A:
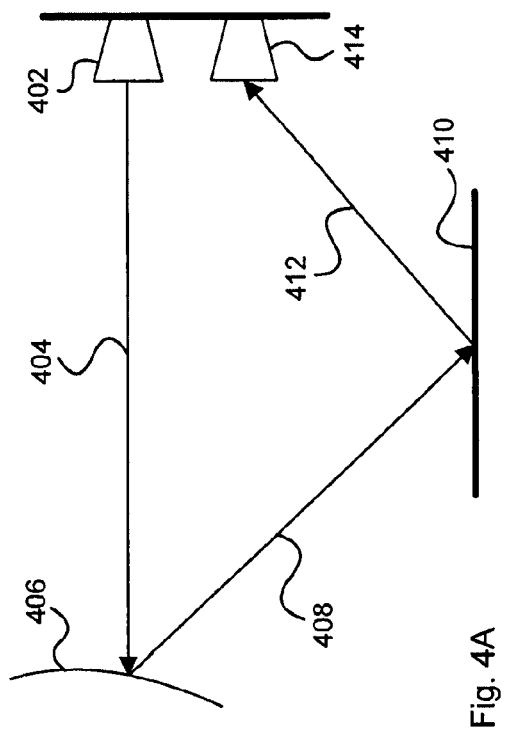
FIG. 4A-G illustrate schematic views of the transformation of polarization states along the pathway of FIG. 3B in the case of an uncoated reflector element.
Figure 4B:
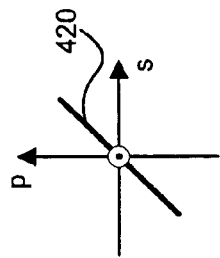

FIG. 4B visualizes schematically a polarization direction 420 of the transmitting antenna 402, whereas it is assumed that the antenna 402 transmits linear polarized radiation. The presentation in FIG. 4A is based upon the FSA ("Forward Scattering Alignment") convention. In this context, the z coordinate of a local right hand coordinate system corresponds to the propagation direction of an electromagnetic wave, the x and y coordinates correspond to an s and a p axis, respectively, whereas the s and p axes designate orientations perpendicular and parallel, respectively, to a normal vector of a surface of the reflector element 410 assumed to be planar.

Conditions are considered, in which radiation strikes the reflector element 410, for example, with an angle of 45° to a normal vector of the surface of the reflector element 410, respectively is reflected from the surface of the reflector element 410. The conditions are fulfilled, for example, in the case of the system illustrated in FIG. 1 for the antenna arrangement 120 disposed close to the floor, and in fact, for example, with reference to an illumination of lower legs of a person who stands on the symbol 116. However, the discussion also applies for an angle of incidence respectively emergence in the proximity of 45°, that is, approximately within a range from 30° to 60°.

Figure 4C:
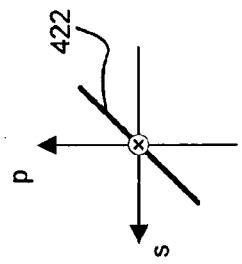

The polarization of the radiation is inclined in the s/p coordinate system by 45°, as shown in FIG. 4B. FIG. 4C shows a polarization 422 of the receiving antenna 414. The polarization 422 of the receiving antenna 414 is identical to the polarization 420 of the transmitting antenna 402. On the basis of the FSA convention, the transmitting and receiving polarization appears orthogonal, that is, the polarization 422 of the receiving antenna 414 is also inclined in the s/p coordinate system by 45°, but seems to be rotated through 90° by comparison with the polarization 420 of the transmitting antenna (compare the different orientation of the s axis in FIGS. 4B and 4C).

Figure 4D:
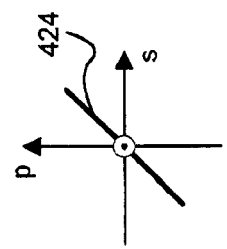
Figure 4E:
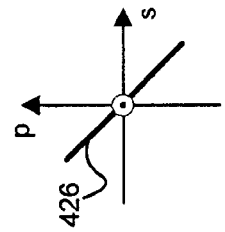

FIG. 4D visualizes a linear polarization 424 of the radiation transmitted from the transmitting antenna 402 on the pathway 404, as results from the polarization 420 of the transmitting antenna according to FIG. 4B. FIG. 4E shows a polarization 426 of the radiation after the reflection on the object 406 on the pathway 408. In this context, it is assumed that a reflection on non-depolarizing surfaces of the object 406 takes place, as is the case, for example, for human skin surfaces or smooth metallic planes.

Figure 4F:
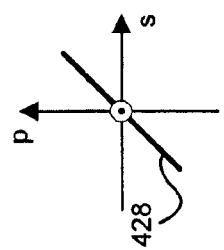
Figure 4G:
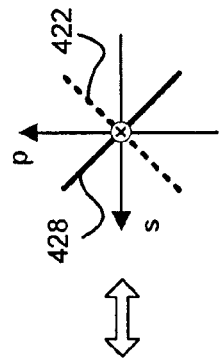

FIG. 4F shows a polarization state 428 of the radiation reflected by the reflector element 410 on the pathway 412. In the polarization state 428, the radiation strikes the location of the receiving antenna 414. FIG. 4G shows the same polarization state 428 as FIG. 4F, but with a display mode analogous to that of FIG. 4C, in which the s axis points to left instead of to right. The polarization 422 of the receiving antenna 414 is drawn dashed. The polarization 428 of the incident, radiation reflected singly on the reflector element 410 is orthogonal to the polarization 422 of the receiving antenna 414, that is, the reception respectively the detection of this single reflection is suppressed with the use of an uncoated reflector.

Figure 5A:
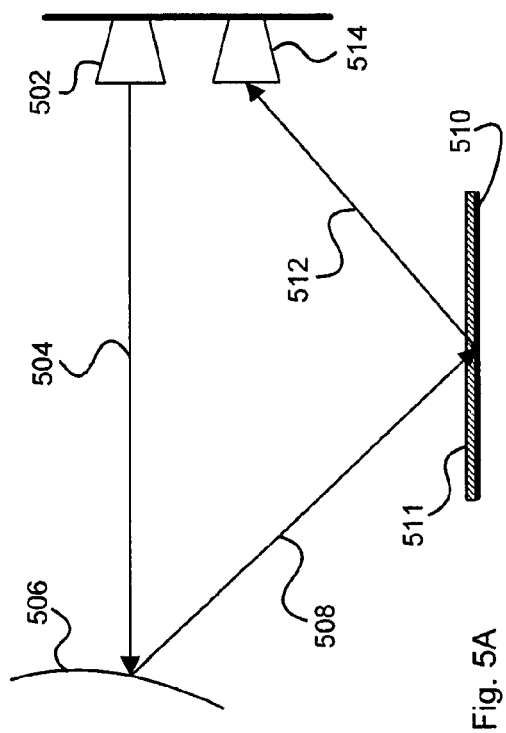
FIG. 5A-G illustrate schematic views of the transformation of polarization states along the pathway of FIG. 3B in the case of a coated reflector element.

FIG. 5A-5G visualize polarization states for a single reflection of the received signal according to FIG. 3B on a reflector with actively polarizing coating. The type of display in FIG. 5A-5G corresponds to that of FIG. 4A-4G. FIG. 5A shows in schematic form a pathway of the radiation, which is transmitted from a transmitting antenna 502 via a pathway 504 in the direction towards an object 506. From the object 506, the radiation is reflected via a pathway 508 in the direction towards a reflector element 510 with coating 511. The radiation is reflected from the element 510, 511 via a pathway 512 to a receiving antenna 514.

Figure 5B:
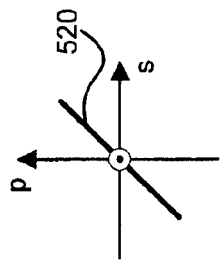
Figure 5C:
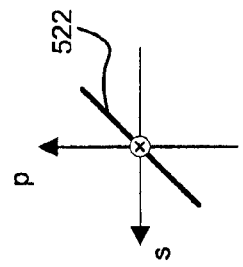

FIG. 5B visualizes a polarization direction 520 of the transmitting antenna 502, whereas the antenna 502 again transmits linear polarized radiation. The polarization of the radiation transmitted from the antenna 502 in the s/p coordinate system is once again inclined by 45°. FIG. 5C shows a polarization 522 of the receiving antenna 514, which is identical to the polarization 520 of the transmitting antenna 502, but which is also in fact inclined by 45° in the s/p coordinate system, but appears tilted by 90° by comparison with the polarization 520 of the transmitting antenna.

Figure 5D:
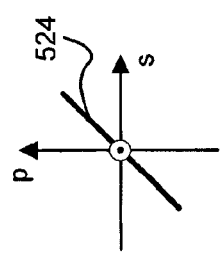
Figure 5E:
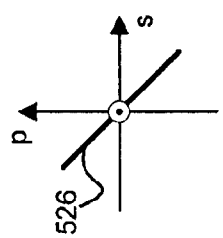
Figure 5F:
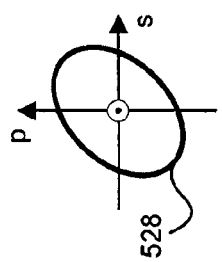

FIG. 5D visualizes a linear polarization 524 of the radiation transmitted from the transmitting antenna 502 on the pathway 504, as results from the polarization 520 of the transmitting antenna according to FIG. 5B. FIG. 5E shows a polarization 526 of the radiation after the reflection on the object 506 on the pathway 508. FIG. 5F shows a polarization state 528 of the radiation reflected from the reflector element 510 and its coating 511 on the pathway 512. Through the influence, for example, of the dielectric coating 511, the linear polarization 526 is transformed into the elliptical polarization 528.

Figure 5G:
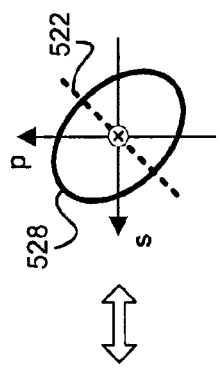

The radiation therefore strikes the location of the receiving antenna 514 with elliptical polarizing respectively polarization. FIG. 5G shows the same polarization state 528 as FIG. 5F, but with a display mode analogous to that of FIG. 5C, whereas the s axis points to left instead of to right. The polarization 522 of the receiving antenna 514 is drawn dashed. A semi-axis of the elliptical polarization 528 of the incident radiation reflected singly on the coated reflector element 410 stands in the direction of the polarization 522 of the receiving antenna 514, so that the reception respectively the detection of this single reflection is less strongly suppressed than with the use of an uncoated reflector, compare FIG. 4G. Accordingly, this single reflection can be detected better with coated reflector than with an uncoated reflector.

FIG. 6A-6G visualize polarization states for a single reflection of the received signal according to FIG. 3C on an uncoated reflector. The type of display in FIG. 7A-7G corresponds to that of FIG. 4A-4G. FIG. 6A once again shows in schematic form a pathway of the radiation which is transmitted from a transmitting antenna 602 via a path 604 in the direction towards a reflector element 606. From the reflector element 606, the radiation is reflected via a pathway 608 in the direction towards an object 610. From the object 610, the radiation is reflected via a pathway 612 to a receiving antenna 614.

Figure 6B:
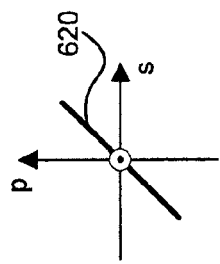
FIG. 6A-G illustrate schematic views of the transformation of polarization states along the pathway of FIG. 3C in the case of an uncoated reflector element.
Figure 6C:
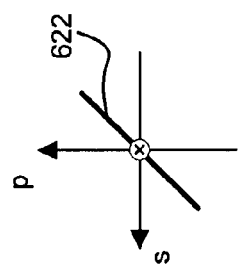

FIG. 6B visualizes schematically a polarization direction 620 of the transmitting antenna 602, whereas it is assumed, that the antenna 602 transmits linear polarized radiation. With the assumptions discussed above with reference to FIG. 4A-4G, the polarization 620 of the radiation transmitted from the antenna 602 is inclined in the s/p coordinate system by 45°. FIG. 6C shows a polarization 622 of the receiving antenna 614, which is identical to the polarization 620 of the transmitting antenna 602, but which is, in fact, also inclined in the s/p coordinate system by 45°, but appears tilted by 90° by comparison with the polarization 620 of the transmitting antenna.

Figure 6G:
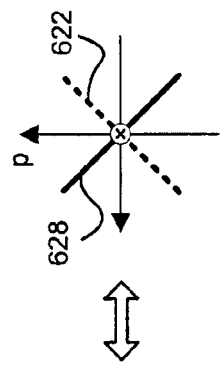
Figure 6F:
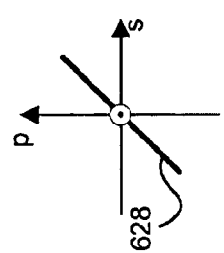
Figure 6A:
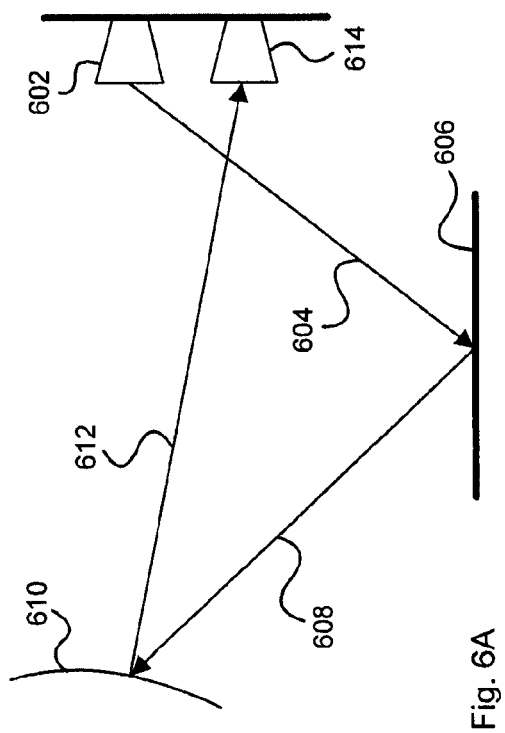
Figure 6E:
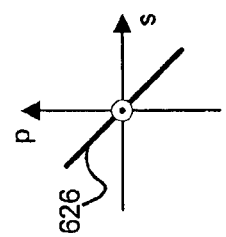
Figure 6D:
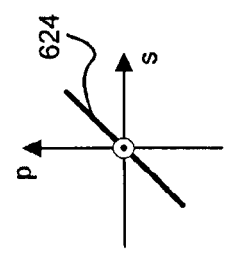

FIG. 6D visualizes a linear polarization 624 of the radiation transmitted from the transmitting antenna 602 on the pathway 604, as results from the polarization 620 of the transmitting antenna according to FIG. 6B. FIG. 6E shows a polarization 626 of the radiation after the reflection on the reflector element 606 on the pathway 608. FIG. 6F shows a polarization state 628 of the radiation reflected from the object 610 on the pathway 612. In the polarization state 628, the radiation strikes the location of the receiving antenna 614.

FIG. 6G shows the same polarization state 628 as FIG. 6F, but with a manner of display analogous to that of FIG. 6C, in which the s axis points to left instead of to right. The polarization 622 of the receiving antenna 614 is adopted from FIG. 6C and drawn dashed here. The polarization 628 of the incident radiation reflected singly on the reflector element 610 is orthogonal to the polarization 622 of the receiving antenna 614, that is, the reception respectively the detection of this variant of the single reflection is also suppressed with the use of an uncoated reflector.

FIG. 7A-7G visualize the polarization states for a single reflection of the received signal according to FIG. 3C on a reflector with actively polarizing coating. The type of display in FIG. 7A-7G corresponds to that of FIG. 4A-4G. FIG. 7A shows in schematic form a pathway of the radiation which is transmitted from a transmitting antenna 702 via a path 704 in the direction towards a reflector element 706 with actively polarizing coating 707. From the element 706, 707, the radiation is reflected via a pathway 708 in the direction towards an object 710. From the object 710, the radiation is reflected via a pathway 712 to a receiving antenna 714.

FIG. 7B visualizes a polarization direction 720 of the transmitting antenna 702, whereas the antenna 702 is again to transmit linear polarized radiation. The polarization of the radiation transmitted from the antenna 702 in the s/p coordinate system is inclined by 45°. FIG. 7C shows a polarization 722 of the receiving antenna 714, which is identical to the polarization 720 of the transmitting antenna 702, but which is, in fact, also inclined by 45° in the s/p coordinate system but appears tilted by 90° by comparison with the polarization 720 of the transmitting antenna.

FIG. 7D visualizes a linear polarization 724 of the radiation transmitted from the transmitting antenna 702 on the pathway 704, as results from the polarization 720 of the transmitting antenna according to FIG. 7B. FIG. 7E shows a polarization 726 of the radiation after the reflection on the reflector element 706 with coating 707 on the pathway 708. Through the influence of the, for example, dielectric coating 707, the linear polarization 726 is transformed into the elliptical polarization 728.

FIG. 7F shows a polarization state 728 of the radiation reflected from the object 710 on the pathway 712. The radiation is still polarized elliptically and strikes the location of the receiving antenna 714 in this manner. FIG. 7G shows the same polarization state 728 as FIG. 7F, but with a manner of display analogous to that of FIG. 7C, whereas the s axis points to left instead of to right. The polarization 722 of the receiving antenna 714 is drawn dashed. A semi-axis of the elliptical polarization 728 of the incident radiation reflected singly on the coated reflector element 706, 707 stands in the direction of the polarization 722 of the receiving antenna 714, so that the reception respectively detection of this single reflection is less strongly suppressed than with the use of an uncoated reflector, compare FIG. 6G, that is, this variant of the single reflection can also be detected better with coated reflector than with uncoated reflector.

FIG. 8A-8H visualize polarization states for a twofold reflection of the received signal according to FIG. 3D on an uncoated reflector. The type of display in FIG. 8A-8G corresponds to that of FIG. 4A-4G. FIG. 8A shows in schematic form a pathway of the radiation which is transmitted from a transmitting antenna 802 via a path 804 in the direction towards the reflector element 806. From the reflector element 806, the radiation is reflected via a pathway 808 in the direction towards an object 810. From the object 810, the radiation is reflected via a pathway 812 back to the reflector element 806. From the reflector element 806, the radiation is reflected on a pathway 814 to a receiving antenna 816.

FIG. 8B visualizes schematically a polarization direction 820 of the transmitting antenna 802, whereas it is assumed that the antenna 802 transmits linear polarized radiation. With the assumptions discussed above with reference to FIG. 4A-4G, the polarization 820 of the radiation transmitted from the antenna 802 is inclined in the s/p coordinate system by 45°. FIG. 8C shows a polarization 822 of the receiving antenna 816, which is identical to the polarization 820 of the transmitting antenna 802, but which is, in fact, also inclined by 45° in the s/p coordinate system, however appears tilted by 90° by comparison with the polarization 820 of the transmitting antenna.

FIG. 8D visualizes a linear polarization 824 of the radiation transmitted from the transmitting antenna 802 on the pathway 804, as results from the polarization 820 of the transmitting antenna according to FIG. 8B. FIG. 8E shows a polarization 826 of the radiation after the first reflection on the reflector element 806 on the pathway 808. FIG. 8F shows a polarization state 828 of the radiation reflected from the object 810 on the pathway 812. FIG. 8G shows a polarization 830 of the radiation after the second reflection on the reflector element 806 on the pathway 814. In the polarization state 830, the radiation strikes the location of the receiving antenna 816.

FIG. 8H shows the same polarization state 830 as FIG. 8F, but with a manner of display analogous to that of FIG. 8C, in which the s axis points to left instead of to right. The polarization 822 of the receiving antenna 816 is adopted from FIG. 8C and drawn dashed here. The polarization 830 of the incident radiation reflected twofold on the reflector element 806 is disposed in the same plane as the polarization 822 of the receiving antenna 816, that is, the reception respectively the detection of the twofold reflection is preferred with the use of an uncoated reflector.

FIG. 9A-9H visualize polarization states for a twofold reflection of the received signal according to FIG. 3D on a reflector with actively polarizing coating. The type of display in FIG. 9A-9H corresponds to that of FIG. 4A-4G. FIG. 9A shows in schematic form a pathway of the radiation which is transmitted from a transmitting antenna 902 via a path 904 in the direction towards a reflector element 906 with actively polarizing coating 907. From the element 906, 907, the radiation is reflected via a pathway 908 in the direction towards an object 910. From the object 910, the radiation is reflected back on a pathway 912 to the coated reflector element 906, 907. From the reflector element 906, 907, the radiation travels via a pathway 914 to a receiving antenna 916.

FIG. 9B visualizes a polarization direction 920 of the transmitting antenna 902, whereas the antenna 902 is again to transmit linear polarized radiation. The polarization of the radiation transmitted from the antenna 902 is inclined in the s/p coordinate system by 45°. FIG. 9C shows a polarization 922 of the receiving antenna 914, which is identical to the polarization 920 of the transmitting antenna 902, but which is, in fact, also inclined by 45° in the s/p coordinate system, however appears tilted by 90° by comparison with the polarization 920 of the transmitting antenna.

FIG. 9D visualizes a linear polarization 924 of the radiation transmitted from the transmitting antenna 902 on the pathway 904, as results from the polarization 920 of the transmitting antenna according to FIG. 9B. FIG. 9E shows a polarization 926 of the radiation after the reflection on the reflector element 906 with coating 907 on the pathway 908. Through the influence of the, for example, dielectric coating 907, the linear polarization 926 is transformed into the elliptical polarization 928.

FIG. 9F shows a polarization state 928 of the radiation reflected from the object 910 on the pathway 912. The radiation is still polarized elliptically and strikes the coated reflector element 906, 907 in this manner. FIG. 9G shows a polarization state 930 of the radiation reflected from the coated reflector element 906, 907 on the pathway 914. Through the renewed influence of the polarizing coating 907, for example, a circular polarization 930 can result, as illustrated in FIG. 9G. In this form, the radiation strikes the location of the receiving antenna 914.

FIG. 9H shows the same polarization state 930 as FIG. 9G, but with a manner of display analogous to that of FIG. 9C, whereas the s axis points to left instead of to right. The polarization 922 of the receiving antenna 914 is drawn dashed. Only a part of the incident radiation reflected twofold on the coated reflector element 906, 907 and now polarized in a circular manner 930 oscillates in the direction of the polarization 922 of the receiving antenna 914, so that the reception respectively the detection of this twofold reflection is less preferred than with the use of an uncoated reflector, compare FIG. 8H, that is, the twofold reflection can be suppressed with a coated reflector, if this is desirable for a concrete imaging system respectively a concrete scanner.

As visualized in the preceding FIG. 4-9, one aspect of an imaging system according to the invention relates, for example, to a targeted generation of a multipath signal through a combination of an imaging radar sensor respectively an arrangement of transmitting and receiving antennas with a reflector element, for example, a reflecting metallic plane. A targeted selection of given components of the multipath signal is possible, for example, by means of transformation of a linear polarization into an elliptical polarization through the reflection on a coating of the reflector element actively polarizing in this manner. Matched with this, the transmitting/receiving antennas should transmit, for example, linear polarized radiation respectively be sensitive to linear polarized radiation.

The provision of an actively polarizing reflector coating, which transforms a linear polarization into an elliptical polarization can increase a reception power of the singly reflected multi path signals by comparison with an uncoated reflector. In this context, a maximization of the reception level of the single reflection can lead to a minimization of the reception power of the twofold reflection.

In other words, a detected power of a given component of a multipath signal is dependent upon the presence or non-presence of a coating, and upon the exact properties of the coating, as will be discussed further below. Accordingly, for arrangements as discussed above, with an odd number of reflections on the coating, for example, for single reflection, it is the case that, without coating, a low level of the single reflection is detected, that is, these signal components are suppressed, while, with a coating, a detectability of this signal component can be improved. For an even number of reflections, for example, twofold reflections, with these arrangements without coating, a maximal level is detected, that is, this signal component is emphasized. With a coating, this component of the multipath signal can be reduced in the detection.

Corresponding to the different character of the single and twofold reflection, a multipath signal can be used especially for the improvement of a frontal object illumination. This is achieved by making the single reflections particularly readily detectable. If the multipath signal is to be used especially for the selective detection of further reflection features, such as edges, this can be achieved by preferring twofold reflections by comparison with single reflections. Such a manner of use is the only one which, under some circumstances, can also be achieved by means of uncoated reflector. Beyond this, super-positions of single and twofold reflections can also be used according to the invention, provided this appears indicated for an optimal imaging quality, including good illumination with the best possible suppression of disturbances in the image reconstruction.

The described aspects can be realized for arbitrary antenna arrangements, for example, for mono or multi static configurations, and/or for one, two or three dimensional antenna arrangements. Per se known methods can be used for the digital focusing (DBF).

The coating of the reflector element can be implemented with a preferably low-loss dielectric; for example, a non-conducting dielectric, that is, an insulating material can be used, which should be applied with specific thickness and permittivity as a coating on the reflector element for the adjustment of the preferred use of the available multipath signal.

In the following, an adjustment of the reception level of given components of a multipath signal is demonstrated with reference to FIG. 10 for the case of a transformation of a linear polarized electromagnetic wave into an elliptical polarized wave, especially for the targeted selection of the single and/or twofold reflection through use of the Fresnel reflection formulas for a plane parallel, homogeneous dielectric 1002 on a metallic half space 1004. In this context, a linear polarized wave which is tilted by 45° to the surface normal is assumed.

For the reflection factor of the coating, the following applies (k=p, s):

$$R_k(f, \theta_i, d, \varepsilon_r) = \frac{r_k - e^{-j2\beta d}}{1 - r_k e^{-j2\beta d}} = |R_k(f, \theta_i, d, \varepsilon_r)| e^{j\varphi_k(f,\theta_i,d,\varepsilon_r)}.$$

For the propagation dimension in the dielectric, the following applies:

$$\beta(f, \theta_i, \varepsilon_r) = \frac{2\pi f}{c_0} \sqrt{\varepsilon_r - \sin^2\theta_i}.$$

The limiting-layer reflection factor for parallel polarization is:

$$r_S(\theta_i, \varepsilon_r) = \frac{\cos\theta_i - \sqrt{\varepsilon_r - \sin^2\theta_i}}{\cos\theta_i + \sqrt{\varepsilon_r - \sin^2\theta_i}}.$$

For the limiting-layer reflection factor for perpendicular polarization, the following applies:

$$r_S(\theta_i, \varepsilon_r) = \frac{\cos\theta_i - \sqrt{\varepsilon_r - \sin^2\theta_i}}{\cos\theta_i + \sqrt{\varepsilon_r - \sin^2\theta_i}}.$$

For a lossless dielectric with rear metallization, the following applies:

$|R_k(f,\theta_i,d,\varepsilon_r)|=1$.

Accordingly, for the reflection factor of the coating (k=p, s), the following applies:

$R_k(f,\theta_i,d,\varepsilon_r)=e^{j\varphi_k(f,\theta_i,d,\varepsilon_r)}$

Figure 10:
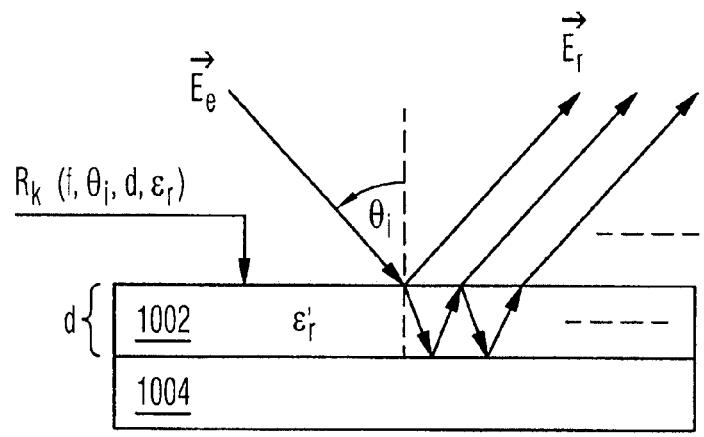
FIG. 10 illustrates a diagram of the reflection of an electromagnetic wave on a reflector element coated according to the invention.

For the incident wave in FIG. 10, the following applies:

$$\vec{E}_e = \begin{bmatrix} E_S \\ E_P \end{bmatrix} = E_0 \begin{bmatrix} 1 \\ 1 \end{bmatrix}.$$

For the reflected wave, the result is:

$$\vec{E}_r = \begin{bmatrix} R_S & 0 \\ 0 & -R_P \end{bmatrix} \cdot \vec{E}_e = \begin{bmatrix} E_S \\ -E_P \cdot e^{j\Delta\varphi} \end{bmatrix} \cdot e^{j\varphi_S}.$$

In this context, the matrix on the left side of the equation is the scattering matrix of the coated reflector surface with use of the FSA convention.

In the above equations:
f is the frequency of the radiation
θ is the angle of incidence
d is the thickness of the dielectric
$\in_r$ is the relative permittivity
$\phi_k$ is the phase factor
$C_0$ is the speed of light in a vacuum With a lossless dielectric with metallized rear side, the entire power is reflected. However, after the reflection on the dielectric layer, a phase offset Δφ results between perpendicular (s) and parallel (p) polarization components of the reflected E-field. The cause for this is a different reflection factor $R_S$ respectively $R_p$ for the two polarization components.

Figure 11:
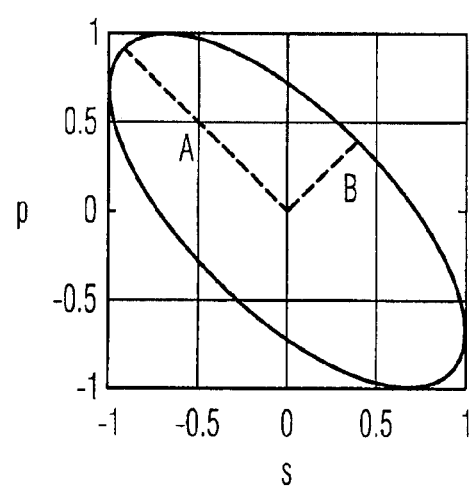
FIG. 11 a visualization of an elliptical polarization after reflection on a reflector element coated according to example embodiments of the invention.

FIG. 11 shows the resulting polarization ellipse 1100. The phase offset Δφ determines the form of the polarization ellipse 1100. The semi-axis marked with "B" represents the relevant polarization axis for the single reflections. The semi-axis marked with "A" represents the relevant polarization axis for the twofold reflection, as visualized in FIG. 4-9.

For the design of a coating for a concrete system, the following procedure is possible: initially, the desired phase offset Δφ between the perpendicular and parallel polarization components can be determined dependent upon a desired coupling respectively connection (more details on this below) to the receiving antennas for the singly and twofold reflected, multipath signal components. Then, the relative permittivity of the coating with which the desired phase offset Δϕ can be achieved can be specified. Furthermore, the coating thickness d can be specified in such a manner that the reflection properties in the operating frequency range are optimal for the expected angle of incidence θi.

These steps can also be implemented in a sequence different from that indicated. For example, if commercially conventional coating materials and/or finishes are used, the steps indicated can optionally be run through iteratively several times.

As a measure for the possible suppression or emphasis of singly respectively twofold reflected multipath signal components, a coupling C, dependent upon a phase offset Δϕ, between a reflected electrical field Er and a receiving antenna can be calculated. The coupling respectively connection C can, for example, be estimated with the assumption of a metallic non-depolarizing scatterer. With regard to the scattering matrices and the polarization vectors, the FSA convention is again used.

For the polarization vector of the transmitting antenna, the following applies:

$$\vec{T} = \frac{1}{\sqrt{2}} [1 \ 1]^T.$$

For the polarization vector of the receiving antenna, the following applies:

$$\vec{R} = \frac{1}{\sqrt{2}} [1 \ -1]^T.$$

The scattering matrix of a metallic target is as follows:

$$\underline{S} = \begin{bmatrix} 1 & 0 \\ 0 & -1 \end{bmatrix}.$$

The scattering matrix of the coated reflective surface is:

$$\underline{M} = \begin{bmatrix} 1 & 0 \\ 0 & -1e^{j\Delta\varphi} \end{bmatrix}.$$

For the coupling of a singly reflected signal, the following then applies:

$$C_{1-fach} \sim |\vec{T}\underline{SM}\vec{R}|^2 = \cdots = \frac{1}{2}(1-\cos\Delta\varphi).$$

For the coupling of a twofold reflected signal, which is dependent upon the twofold phase offset Δϕ, because the wave is reflected twice on the coating, the following applies:

$$C_{2-fach} \sim |\vec{T}\underline{MSM}\vec{R}|^2 = \cdots = \frac{1}{2}(1+\cos 2\Delta\varphi).$$

Figure 12A:
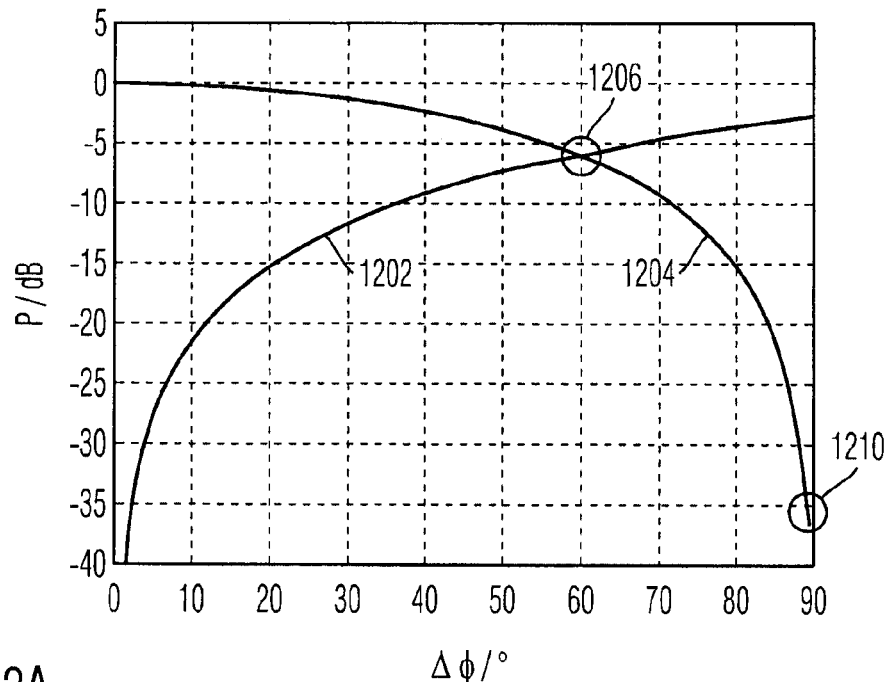
FIG. 12A illustrates a diagram for the coupling of a reflected electromagnetic wave dependent upon a phase offset after reflection on a reflector element coated according to example embodiments of the invention.

FIG. 12A presents these contexts graphically for the single 1202 and the twofold 1204 reflection. In the case of a non-depolarizing object, the phase offset Δϕ therefore substantially determines the maximal coupling C between receiving antenna and reflected electrical field Er, which is represented in FIG. 12A as an attenuation of a reception strength P in decibels (dB).

Figure 12B:
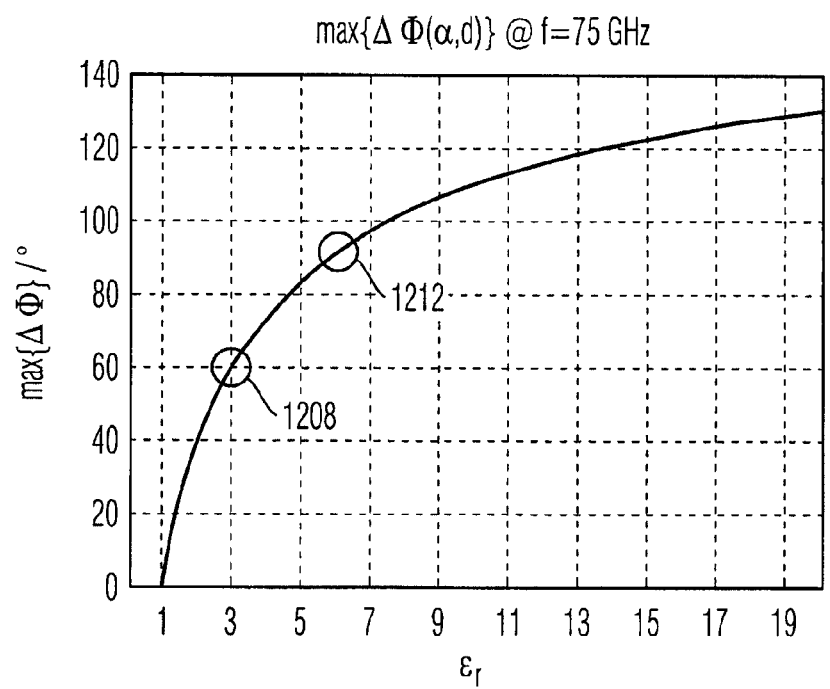
FIG. 12B illustrates a diagram showing a maximal phase offset dependent upon a permittivity of a coating material.

FIG. 12B presents the maximal phase offset Δϕ dependent upon the relative permittivity $\in_r$ of the coating material. The requirements for the permittivity of the coating material which are needed in order to achieve a given configuration of multipath signal components in the receiving antenna can be determined from FIGS. 12A and 12B.

If, for example, a superposition of single and twofold reflections is to be detectable in the antenna, this then means an approximately equally strong coupling in the antenna, that is, the position in the graph of FIG. 12A marked by the circle 1206. From the position 1206, a phase offset of approximately 60° is obtained, which is achieved with a relative permittivity of approximately $\in_r=3$, as evident from FIG. 12B, number 1208. Such permittivity is achieved, for example, with plexiglass, as discussed above with reference to FIG. 2.

If the twofold reflection is to be suppressed, and the single reflection is to be detectable by preference, this corresponds to a phase offset in the region of 90° in FIG. 12A, number 1210. From FIG. 12B, the required permittivity is obtained at approximately $\in_r=6$ (number 1212). For example, C1 rubber provides a permittivity in this range.

Figure 13:
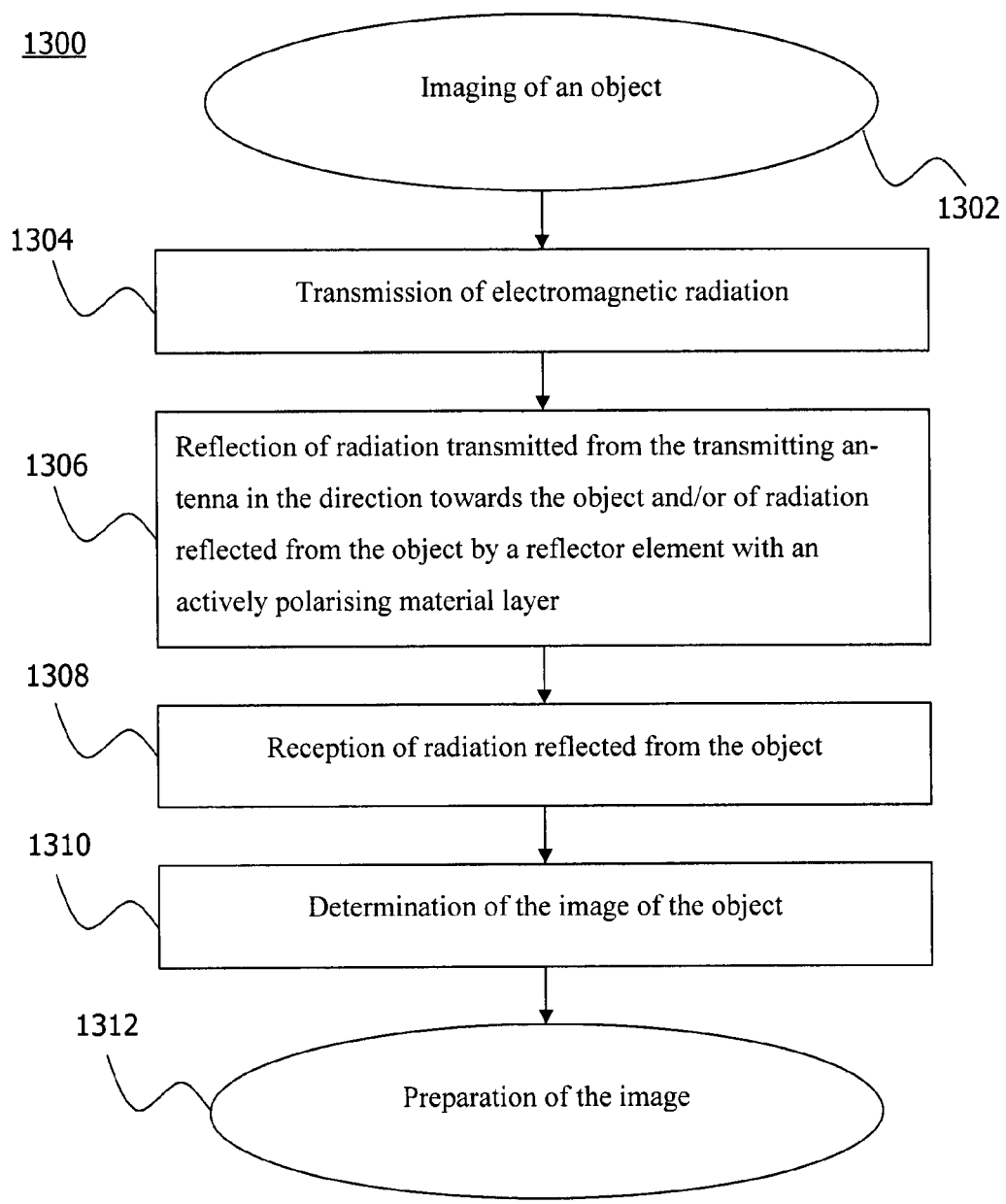
FIG. 13 illustrates a diagram depicting a manner of operation of the system from FIG. 1A.

FIG. 13 visualizes in the form of a flow diagram a method 1300 for imaging an object 1302. The method 1300 can be implemented, for example, as an operating method for an imaging system, for example, a full body scanner.

In a step 1304, electromagnetic radiation is transmitted in a first polarization state for the illumination of an object. The radiation can be transmitted from a transmitting antenna polarized in an approximately linear manner with a given oscillation plane in space.

In a step 1306, the reflection of radiation transmitted from the transmitting antenna in the direction towards the object and/or reflection of radiation reflected from the object in the direction towards a receiving antenna occurs on at least one reflector element. In this context, a radiation component reflected from the reflector element is transformed by an actively polarizing material layer on the reflector element into a polarization state such that the radiation component in the receiving antenna is in the second polarization state.

In a step 1308, radiation of a second polarization state reflected from the object is received. For example, the radiation can be received by a receiving antenna which is preferentially sensitive to a linear polarization with a given oscillation plane. The oscillation planes of transmitting and receiving antennas can be the same or can be tilted relative to one another.

In a step 1310, an image of the object based upon the radiation received from the receiving antenna is determined. Techniques of synthetic focusing can be implemented at the transmitter end before step 1304, and/or implemented at the receiver end as a part of step 1310. These techniques can be matched to the multipath signal components to be preferentially detected.

For systems with a plurality of receiving and/or transmitting antennas, which are operated, for example, in a multistatic mode, the steps should be implemented several times, and optionally, entirely or partially in parallel.

The method ends in step 1312, for example, with the output of the given image on a display screen.

Theoretical explanations of technical effects achieved by the invention are not to restrict the scope of the invention.

Also, the invention is not restricted to the exemplary embodiments described and the aspects emphasized here; on the contrary, a plurality of modifications are possible within the range specified by the dependent claims, which fall within the scope of action of the person skilled in the art. In particular, given combinations of features described separately above are evident to the person skilled in the art as expedient or advantageous.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system for imaging of an object, comprising:
   at least one transmitting antenna configured to transmit electromagnetic radiation of a first polarization state for illumination of the object;
   at least one receiving antenna configured to receive radiation of a second polarization state reflected from the object;
   at least one reflector element configured to one or more of reflect radiation transmitted from the transmitting antenna in a direction towards the object, and reflect radiation reflected from the object in a direction towards the receiving antenna;
   an actively polarizing layer disposed on the reflector element configured to transform a radiation component reflected from the reflector element into a polarization state such that the radiation component in the receiving antenna is in the second polarization state; and
   a processing unit configured to determine an image of the object based on the radiation received by the receiving antenna.

2. The system according to claim 1, wherein the actively polarizing layer is active in transforming a linear polarization into an elliptical polarization.

3. The system according to claim 2, wherein the actively polarizing layer comprises a dielectric.

4. The system according to claim 1, wherein the actively polarizing layer is configured in such a manner that a radiation component reflected singly from the reflector element is detected in the receiving antenna.

5. The system according to claim 4, wherein the actively polarizing layer is configured such that a superposition comprising the singly reflected radiation component and a twofold reflected radiation component from the reflector element is detected in the receiving antenna.

6. The system according to claim 1, wherein the transmitting antenna is configured to transmit linear polarized radiation, and the receiving antenna is configured to receive linear polarized radiation.

7. The system according to claim 6, wherein the reflector element is tilted by an angle of 45° to 135°, with reference to a plane in which one or more of the transmitting antenna the receiving antenna is/are arranged.

8. The system according to claim 1, wherein the actively polarizing layer comprises one or more of polyethylene terephthalate, polycarbonate, glass, acrylic glass, and rubber.

9. The system according to claim 1, wherein a thickness of the actively polarizing layer is smaller than one quarter of a wavelength of the radiation.

10. The system according to claim 1, wherein a relative permittivity coefficient of the actively polarizing layer is within range of 2 to 4.

11. The system according to claim 1, further comprising one or more of a plurality of transmitting antennas and a plurality of receiving antennas configured for operation in a mono-static or multi-static configuration.

12. The system according to claim 1, wherein the processing unit is further configured to provide for one or more of transmitter-end and receiver-end synthetic focusing.

13. A method for imaging an object, comprising:
   transmitting electromagnetic radiation of a first polarization state for illumination of the object;
   reflecting one or more of radiation transmitted from at least one transmitting antenna to at least one reflector element in a direction towards the object, and radiation reflected from the object in a direction towards at least one receiving antenna, wherein a radiation component reflected from the at least one reflector element is transformed through an actively polarizing layer on the at least one reflector element into a polarization state such that the radiation component in the receiving antenna is in the second polarization state;
   receiving radiation of a second polarization state reflected from the object; and
   determining an image of the object based on the radiation received by the receiving antenna.

14. The system according to claim 1, wherein a relative permittivity coefficient of the actively polarizing layer is greater than 5.

* * * * *